(12) United States Patent
Xie et al.

(10) Patent No.: US 12,464,356 B2
(45) Date of Patent: Nov. 4, 2025

(54) SYSTEMS AND METHODS FOR MULTIPLE POINT SASE ACCESS CONTROL (71) Applicant: Fortinet, Inc., Sunnyvale, CA (US)

(72) Inventors: Michael Xie, Palo Alto, CA (US); Yong Zhang, Belmont, CA (US); Reuben Stanley Wilson, Oswestry (GB)

(73) Assignee: Fortinet, Inc., Sunnyvale, CA (US)

( * ) Notice: Subject to any disclaimer, the term of this patent is extended or adjusted under 35 U.S.C. 154(b) by 208 days.

(21) Appl. No.: 18/237,314

(22) Filed: Aug. 23, 2023

(65) Prior Publication Data
US 2025/0071552 A1 Feb. 27, 2025

(51) Int. Cl.
*H04W 12/08* (2021.01)

(52) U.S. Cl.
CPC ................................ *H04W 12/08* (2013.01)

(58) Field of Classification Search
CPC .... H04L 12/4633; H04L 63/20; H04L 41/122
See application file for complete search history.

(56) References Cited

U.S. PATENT DOCUMENTS

2024/0214424 A1* 6/2024 Ossipov .................. H04L 41/40
2024/0214425 A1* 6/2024 Ossipov ................ H04L 63/105

* cited by examiner

*Primary Examiner* — Bryan Y Lee
(74) *Attorney, Agent, or Firm* — Law Office of Dorian Cartwright; Dorian Cartwright (57) ABSTRACT

Various systems, devices, storage media, and methods are discussed for performing secured access service edge (SASE) processing in a network potentially having multiple SASE processing capable devices.

20 Claims, 6 Drawing Sheets

SYSTEMS AND METHODS FOR MULTIPLE POINT SASE ACCESS CONTROL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright® 2023, Fortinet, Inc.

FIELD

Embodiments discussed generally relate to systems and methods for distributing network security, and more particularly to systems and methods for performing secured access service edge (SASE) processing in a network potentially having multiple SASE processing capable devices.

BACKGROUND

Network security continues to migrate from centralized security solutions to edge security solutions. Such migration often involves use of SASE services that are accessed by network processing device at the edge of a secure network. In many cases this network processing device is a firewall or other network security device. Thus, where a network transaction is initiated by a network device within the secure network, the network device provides a transaction request to the firewall device, and the firewall device directly accesses any SASE service prior to directing a corresponding network transaction onto an unsecure network. Such an approach generally works well, but in coming network topologies it may not be adequate.

Accordingly, there is a need in the art for advanced systems and methods for network security that is both effective and lower cost that existing solutions.

SUMMARY

Various systems, devices, storage media, and methods are discussed for performing SASE processing in a network potentially having multiple SASE processing capable devices.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various systems, devices, storage media, and methods are discussed for performing SASE processing in a network potentially having multiple SASE processing capable devices.

A secure network having two or more SASE capable processing devices is envisioned. Such a secure network would have, for example, a network security appliance at one perimeter of the secure network acting as a gateway for, inter alia, outgoing network traffic from a secure network to an unsecure network, and a wireless access point acting as a gateway for endpoint devices accessing the secure network. Both of the aforementioned devices would include SASE capability. In such a scenario, a SASE tunnel in tunnel could be triggered where, for example, network traffic is received at the wireless access point which performs SASE processing on the network traffic, and that network traffic is then passed to the network security appliance which duplicates the SASE processing. The aforementioned problem multiplies where more intermediary network processing devices are involved. As a particular example, network traffic is received at the wireless access point which performs SASE processing on the network traffic, and that network traffic is then passed to a first network security appliance (e.g., a Fortinet™ Switch) which again performs SASE processing on the network traffic. The network traffic may then be transferred from the first network security appliance to a second network security appliance (e.g., a Fortinet™ Extender), which again performs SASE processing on the network traffic. Such a scenario is, of course wasteful and time consuming.

Various embodiments disclosed herein provide mechanisms that allow for efficient operation of a secure network including multiple SASE capable network devices. In some such embodiments, an arbitration between SASE capable network devices occurs to select a network device to perform the SASE processing, and all network devices comply with the outcome of the arbitration. Various embodiments provide for a wireless access point capable of SASE processing to perform SASE processing through direct connection to a SASE service without relying on other devices such as, for example, a digital subscriber line (DLS) or a cable modem in the middle.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, the phrase "wireless network access point" is any network device by which a network device may access a secure network via a wireless interface. Based upon the disclosure provided herein, one of ordinary skill in the art will recognize a variety of wireless access points that may be used in relation to different embodiments.

As used herein, the phrase "intermediary network processing device" is any network device that receives network traffic and passes the network traffic to another network device. Such an intermediary network processing device may be, but is not limited to, a network security appliance acting as an interface between a secure network and an unsecure network. As another example, such an intermediary network processing device may be a network switch. Based upon the disclosure provided herein, one of ordinary skill in the art will recognize a variety of intermediary network processing devices that may be used in relationship to different embodiments.

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide wireless access point devices that include: a processing resource, and a non-transitory computer-readable medium coupled to the processing resource. The non-transitory computer-readable medium has stored therein instructions that when executed by the processing resource cause the processing resource to: upon determining that at least one other SASE processing capable device exists in a secure network, arbitrate with the at least one other SASE processing capable device to identify which of the wireless access point or the at least one other SASE processing capable device is selected to perform SASE processing; upon determining that the wireless access point is the only SASE processing capable device in the secure network, identify the wireless access point as selected to perform SASE processing; receive a network traffic; and where the wireless access point is identified as selected to perform SASE processing, provide a subset of the network traffic to a SASE service provider for processing.

In some instances of the aforementioned embodiments, the non-transitory computer-readable medium has stored therein instructions that when executed by the processing resource cause the processing resource to determine whether another SASE processing capable device exists in the secure network that includes the wireless access point. In various instances of the aforementioned embodiments, the non-transitory computer-readable medium has stored therein instructions that when executed by the processing resource cause the processing resource to: receive an indication from the SASE service provider that the network traffic is safe; and open a network session corresponding to the network traffic.

In various instances of the aforementioned embodiments, the non-transitory computer-readable medium has stored therein instructions that when executed by the processing resource cause the processing resource to: where the at least one other SASE processing capable device is selected to perform SASE processing; and forwarding the network traffic to the at least one other SASE processing capable device. In some instances of the aforementioned embodiments the at least one other SASE processing capable device is either a network security appliance, or a network switch.

In some instances of the aforementioned embodiments, arbitrating with the at least one other SASE processing capable device to identify which of the wireless access point or the at least one other SASE processing capable device is selected to perform SASE processing includes: determining if the wireless access point is a gateway for outgoing network traffic from the secure network to an unsecure network; and upon determining that the wireless access point is the gateway for outgoing network traffic from the secure network to the unsecure network, identifying the wireless access point as selected to perform SASE processing. In some such instances, arbitrating with the at least one other SASE processing capable device to identify which of the wireless access point or the at least one other SASE processing capable device is selected to perform SASE processing further includes sending a message from the wireless access point to the at least one other SASE processing capable device indicating that the wireless access point is selected to perform SASE processing.

In various instances of the aforementioned embodiments, arbitrating with the at least one other SASE processing capable device to identify which of the wireless access point or the at least one other SASE processing capable device is selected to perform SASE processing includes: determining if the wireless access point is a gateway for outgoing network traffic from the secure network to an unsecure network; and upon determining that the at least one other SASE processing capable device is the gateway for outgoing network traffic from the secure network to the unsecure network, identifying the at least one other SASE processing capable device as selected to perform SASE processing. In some such instances, arbitrating with the at least one other SASE processing capable device to identify which of the wireless access point or the at least one other SASE processing capable device is selected to perform SASE processing further includes sending a message from the at least one other SASE processing capable device to the wireless access point indicating that the at least one other SASE processing capable device is selected to perform SASE processing.

Other embodiments provide methods for performing SASE processing. The methods include: determining, by a wireless access point in a secure network, whether another SASE processing capable device exists in the secure network; upon determining that at least one other SASE processing capable device exists in the secure network, arbitrating, by the wireless access point, with the at least one other SASE processing capable device to identify which of the wireless access point or the at least one other SASE processing capable device is selected to perform SASE processing; upon determining that the wireless access point is the only SASE processing capable device in the secure network, identifying, by the wireless access point, the wireless access point as selected to perform SASE processing; receiving, by the wireless access point, a network traffic; and where the wireless access point is identified as selected to perform SASE processing, providing, by the wireless access point, a subset of the network traffic to a SASE service provider for processing.

Yet other embodiments provide non-transitory computer-readable media having stored therein instructions that when executed by a processing resource cause the processing resource to perform a method comprising: upon determining that at least one other secured access service edge (SASE) processing capable device exists in a secure network, arbitrating with the at least one other SASE processing capable device to identify which of the wireless access point or the at least one other SASE processing capable device is selected to perform SASE processing; upon determining that the wireless access point is the only SASE processing capable device in the secure network, identifying the wireless access point as selected to perform SASE processing; receiving a network traffic; and where the wireless access point is identified as selected to perform SASE processing, providing a subset of the network traffic to a SASE service provider for processing.

Figure 1A:
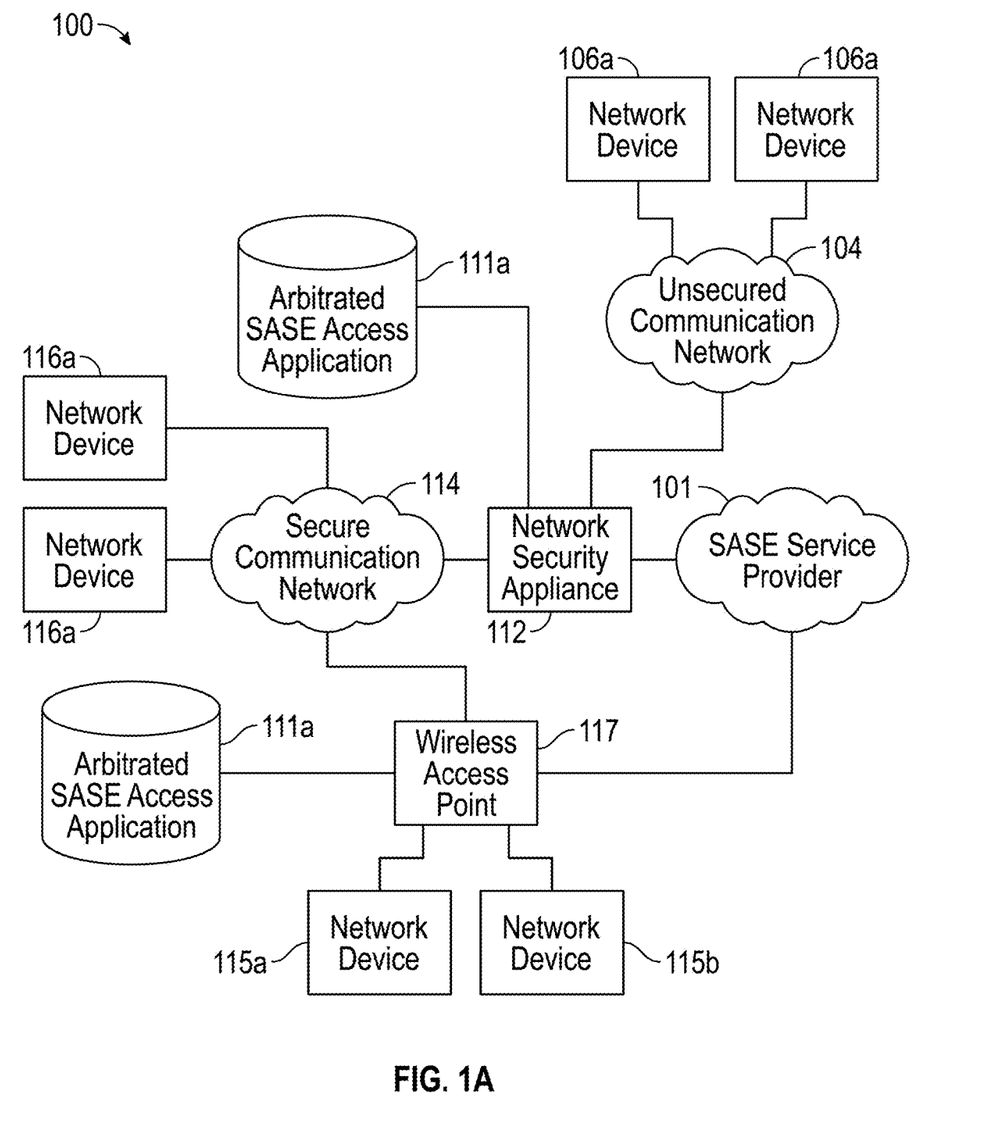
FIGS. 1A-1E illustrate network architectures including secure networks having multiple SASE capable network processing devices in accordance with various embodiments.

Turning to FIG. 1A, network architecture 100 is shown having a secure communications network 114 having multiple SASE capable network processing devices (i.e., a wireless access point 117 and a network security appliance 112). Secure communication network 114 may be any type of communication network known in the art. Those skilled in the art will appreciate that, communication network 114 can be wireless network, a wired network, or a combination thereof that can be implemented as one of the various types of networks, such as an Intranet, a Local Area Network (LAN), a Wide Area Network (WAN), an Internet, and the like. Further, secure communication network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Secure communication network 114 provides for communications to/from a number of network devices 116 (i.e., network device 116a and network device 116b) and/or wireless access point 117. Wireless access point 117 may be any device known in the art that provides for wireless communications between one or more network devices 115 (i.e., network device 115a and network device 115b) and secure communications network 114.

Network security appliance 112 provides a secure gateway between an unsecured communication network 104 and secure communications network 112. Unsecured communications network 104 provides communication access to one or more network devices 106 (i.e., network device 106a and network device 106b). Unsecured communications network 104 may be any type of communication network known in the art. Those skilled in the art will appreciate that, unsecured communication network 104 can be wireless network, a wired network, or a combination thereof that can be implemented as one of the various types of networks, such as an Intranet, a Local Area Network (LAN), a Wide Area Network (WAN), an Internet, and the like. Further, unsecured communication network 104 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Network security appliance 112 and wireless access point 117 each execute an instance of an arbitrated SASE access application 111 (i.e., arbitrated SASE access application 111a and arbitrated SASE access application 111b, respectively). Executing arbitrated SASE access application 111 provides for determining which of wireless access point 117 or network security appliance 112 will perform SASE processing for network traffic introduced to secure communication network 114 via wireless access point 117. The aforementioned SASE processing includes providing a subset of received network traffic to a SASE service provider 101, and receiving a response from SASE service provider 101 indicating that the network traffic is safe or unsafe. As shown if FIG. 1A, the network traffic is provided to SASE service provider 101 via a direct connection. Thus, for example, where wireless access point 117 is to perform the SASE processing, wireless access point 117 connects to SASE service provider 101. Alternatively, where network security appliance 112 is to perform the SASE processing, network security appliance 112 connects to SASE service provider 101. This avoids the SASE tunnel in tunnel problem discussed above where two devices become involved in the SASE service processing. Based upon the disclosure provided herein, one of ordinary skill in the art will recognize a variety of processes that may be applied by SASE service provider 101 in making the determination of safe or unsafe.

The determination as to which of wireless access point 117 or network security appliance 112 will perform SASE processing for network traffic introduced to secure communication network 114 via wireless access point 117 may be made, for example, similar to that discussed below in relation to FIG. 4. Once the determination is made, any network traffic introduced to secure communication network 114 via wireless access point 117 will have SASE processing applied by the determined one of wireless access point 117 or network security appliance 112. Such SASE processing may be done, for example, similar to that discussed below in relation to FIGS. 2-3. It is noted that while FIG. 1A is shown as having two possible performers of the SASE processing (wireless access point 117 and network security appliance 112), three or more performers may be included. For example, a switch may be included in secure communication network that is also capable of performing SASE processing and executes another instance of arbitrated SASE access application 111, where the switch transfers network traffic between network security appliance 112 and wireless access point 117. Based upon the disclosure provided herein, one of ordinary skill in the art will recognize a variety of network topologies and a number of SASE capable network devices that may be used in relation to different embodiments.

Figure 1B:
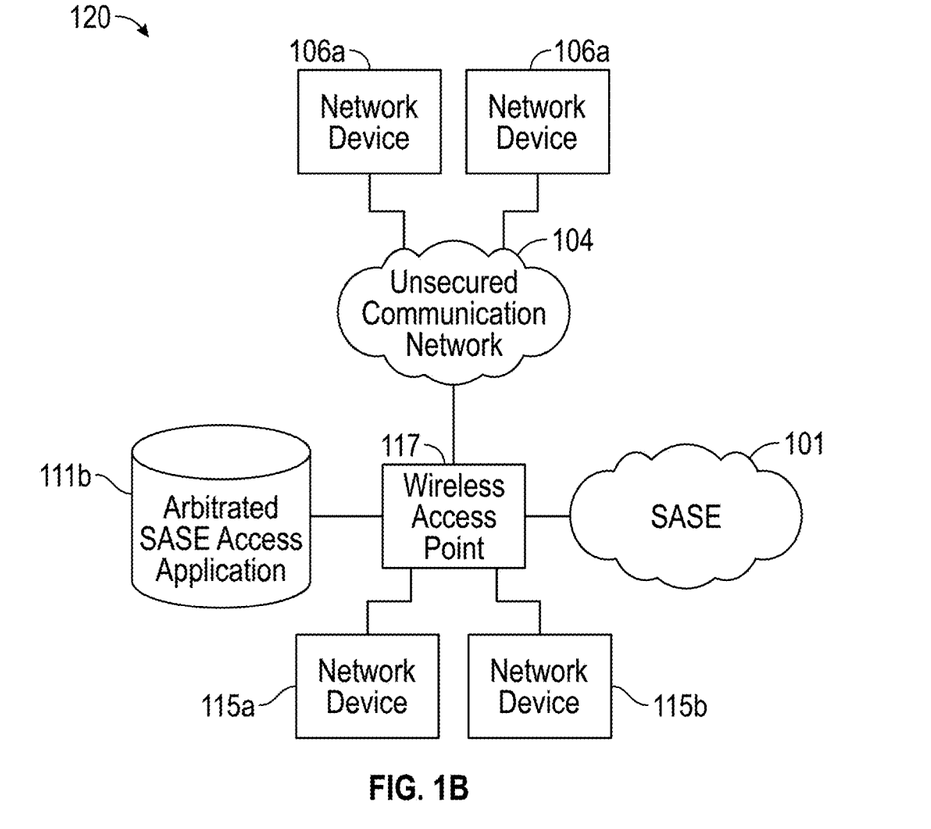

Turning to FIG. 1B, network architecture 120 is shown having wireless access point 117 as a single SASE capable network processing device. Wireless access point 117 provides direct communication to/from unsecured communication network 104. In this configuration, it is determined that wireless access point 117 is the only SASE capable processing device. As such, when network traffic is introduced to/from wireless access point 117, wireless access point 117 performs SASE processing.

Figure 1C:
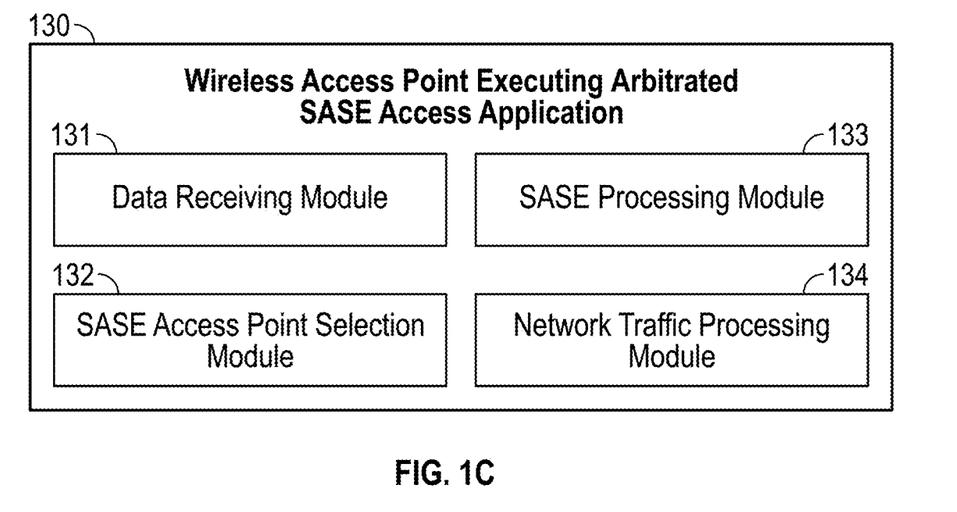

Turning to FIG. 1C, a wireless access point executing an arbitrated SASE application 130 (e.g., wireless access point 117 executing arbitrated SASE application 111b) is shown in accordance with some embodiments. As shown, wireless access point executing an arbitrated SASE application 130 includes a data receiving module 131, a SASE access point selection module 132, a SASE processing module 133, and a network traffic processing module 134.

Data receiving module 131 is configured to receive network traffic. In some cases, the network traffic is received via a wireless communication interface from a network device communicably coupled to the wireless access point. Any device or software known in the art for receiving network traffic may be used in relation to different embodiments. Network traffic processing module 134 is configured to either open a network session or deny a network session depending upon a result of the SASE processing. Any device or software known in the art for opening and/or denying network sessions may be used in relation to different embodiments SASE access point selection module 132 is configured to interact with other devices on a network to determine which if the devices will be responsible for performing SASE processing. In some embodiments, SASE access point selection module 132 may operate similar to that discussed below in relation to FIG. 4.

SASE processing module 133 is configured to perform SASE processing where network traffic is received that involves SASE processing and the device is determined to be the device in the network that is responsible for SASE processing. In some embodiments, SASE processing module 133 may operate similar to that discussed below in relation to FIG. 2.

Figure 1D:
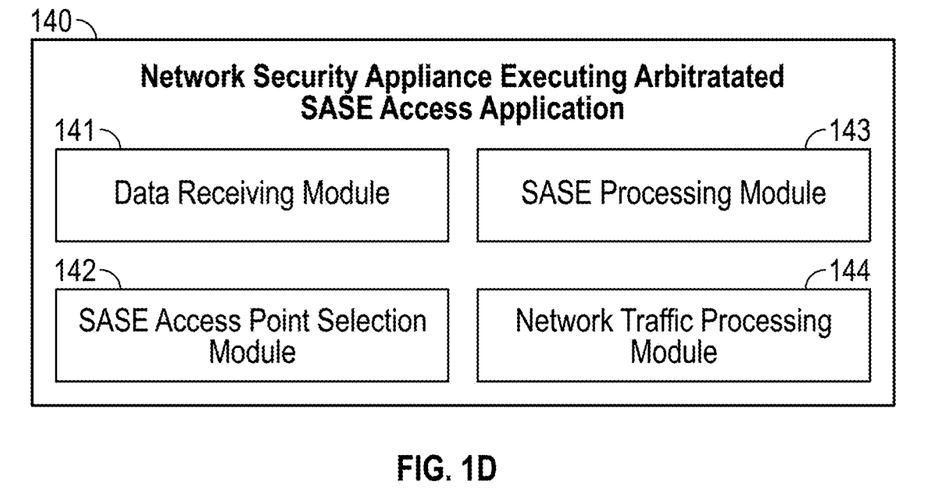

Turning to FIG. 1D, a network security appliance executing an arbitrated SASE application 140 (e.g., network security appliance 112 executing arbitrated SASE application 111a) is shown in accordance with some embodiments. As shown, network security appliance executing an arbitrated SASE application 140 includes a data receiving module 141, a SASE access point selection module 142, a SASE processing module 143, and a network traffic processing module 144.

Data receiving module 141 is configured to receive network traffic. In some cases, the network traffic is received via a network security appliance from a network device or an external network. Any device or software known in the art for receiving network traffic may be used in relation to different embodiments. Network traffic processing module 134 is configured to either open a network session or deny a network session depending upon a result of the SASE processing. Any device or software known in the art for opening and/or denying network sessions may be used in relation to different embodiments SASE access point selection module 142 is configured to interact with other devices on a network to determine which if the devices will be responsible for performing SASE processing. In some embodiments, SASE access point selection module 142 may operate similar to that discussed below in relation to FIG. 4.

SASE processing module 143 is configured to perform SASE processing where network traffic is received that involves SASE processing and the device is determined to be the device in the network that is responsible for SASE processing. In some embodiments, SASE processing module 143 may operate similar to that discussed below in relation to FIG. 3.

Figure 1E:
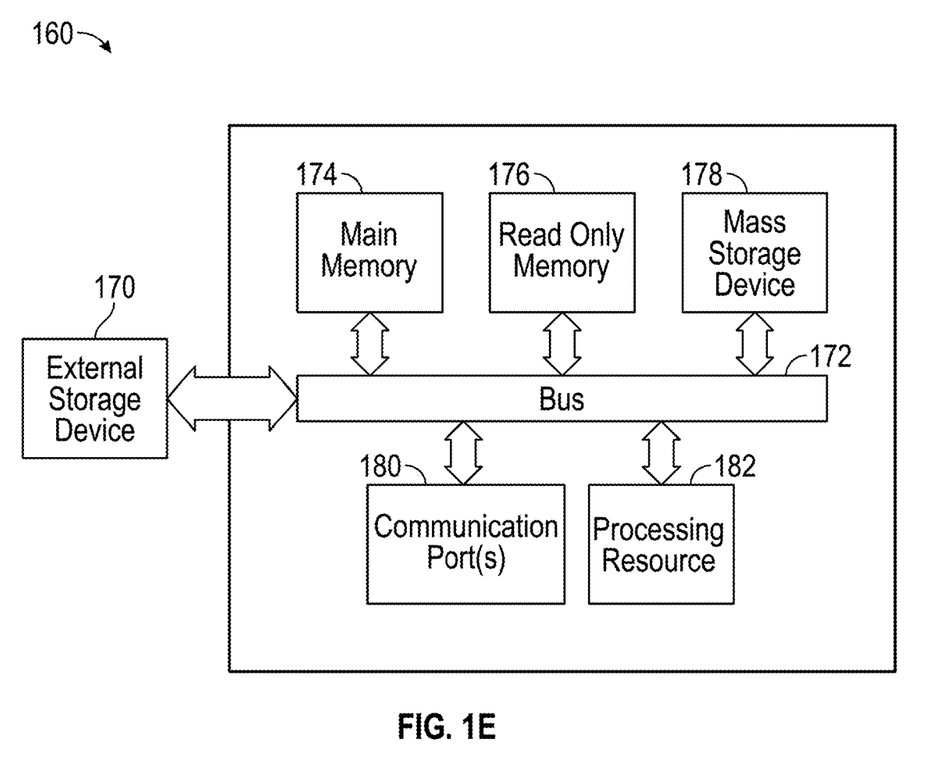

Turning to FIG. 1E, an example computer system 160 is shown in which or with which embodiments of the present disclosure may be utilized. As shown in FIG. 1E, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K 1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
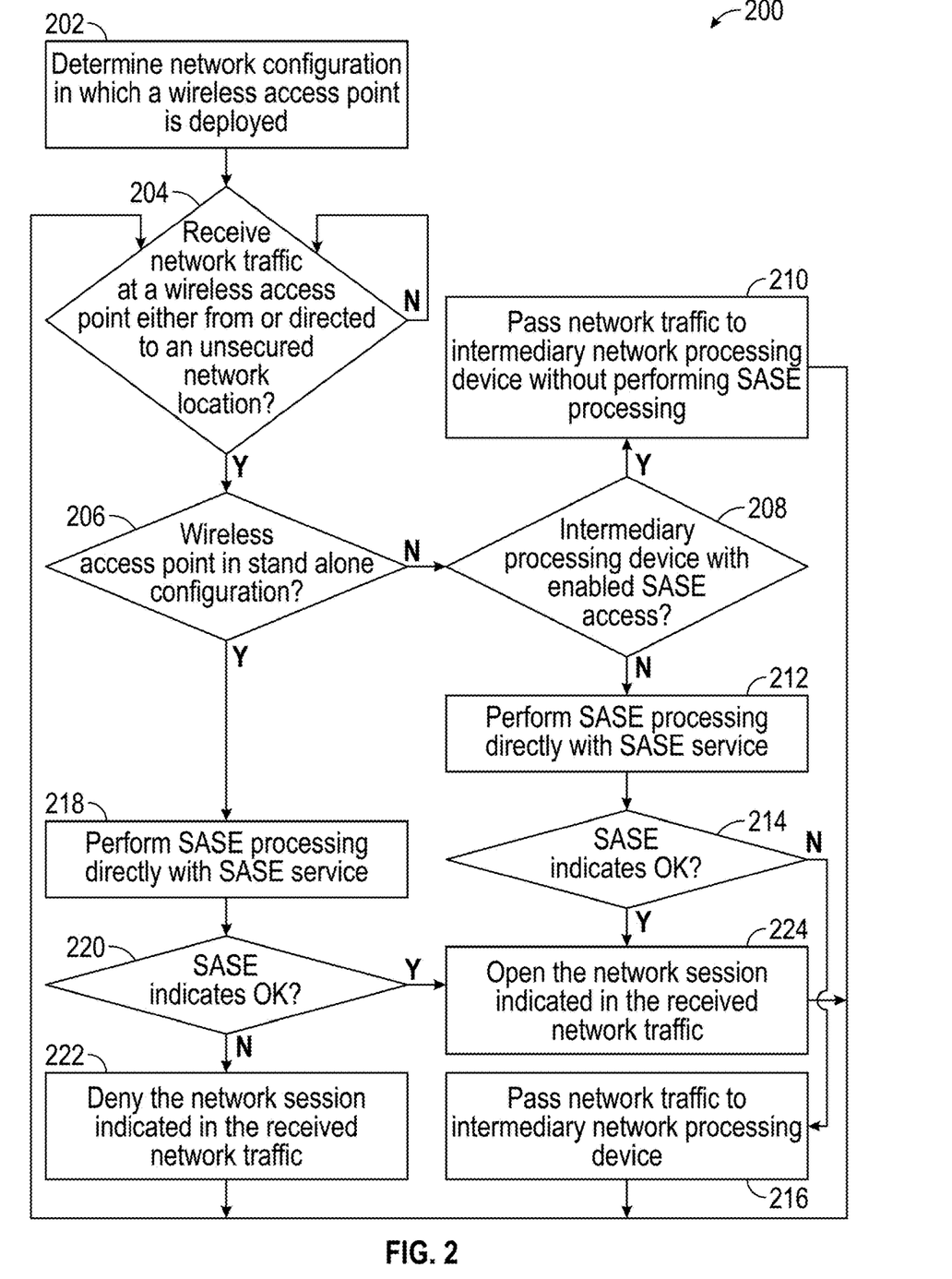
FIG. 2 is a flow diagram showing a method in accordance with some embodiments for performing SASE processing from the perspective of a wireless access point.

Turning to FIG. 2, a flow diagram 200 shows a method in accordance with some embodiments for performing SASE processing from the perspective of a wireless access point. Following flow diagram 200, a given wireless network access point executes computer readable instructions causing it to determine a network configuration in which it is deployed (block 202). Determining the network configuration includes determining a location in the network relative to other intermediary network devices. Thus, for example, a wireless access point may determine that it is the only access point in the particular secure network. As another example, a wireless access point may determine that it provides wireless access to a secure network that includes one or more other intermediary network processing devices between the wireless access point and an unsecure network. Based upon the disclosure provided herein, one of ordinary skill in the art will recognize a variety of methods that may be used in accordance with different embodiments for determining a location of a wireless access point within a network.

The aforementioned process of determining the relative location in a network relative to other intermediary network processing devices may be done each time a new wireless access point or intermediary network processing device is introduced into a secure network or removed from the secure network. This may be part of determining which network device in the secure network will be performing SASE processing. An example of such processing is discussed more fully in relation to FIG. 4 below.

It is determined whether the wireless access point has received network traffic either from or directed to an unsecure network location (block 204). Where network traffic has been received by the wireless access point (block 204), it is determined whether the wireless access point is in a standalone configuration (block 206). The wireless access point is considered to be in a standalone configuration where there are no other intermediary network processing devices that the network traffic must transit between the secure network and an unsecure network. Thus, for example, where the wireless access point is located in an individual's home and is the gateway between a number of network devices deployed in the individual's home and the Internet. Based upon the disclosure provided herein, one of ordinary skill in the art will recognize a variety of network architectures in which a wireless access point would be considered standalone.

Where the wireless access point is determined to be in a standalone configuration (block 206), SASE processing on the received network traffic is performed as directed by the wireless access point (block 218). Any SASE processing known in the art may be used. As an example, in some embodiments all or part of the network traffic may be sent to an SASE service provider via a direct connection between the wireless access point and the SASE service provider that does not rely on, for example, other devices such as a digital subscriber line (DSL) device or a cable modem. The SASE service provider performs one or more security processes on the information received from the wireless access point and returns a result of the security processes to the wireless access point. Based upon the disclosure provided herein, one of ordinary skill in the art will recognize a variety of SASE service providers and/or internal SASE services that may be used in relation to embodiments discussed herein. Further, based upon the disclosure provided herein, one of ordinary skill in the art will recognize a variety of security processes that may be applied by a selected SASE service provider.

Where the SASE service provider returns an indication that the network traffic is acceptable (block 220), the network session corresponding to the received network traffic is opened by the wireless access point (block 224). Any process known in the art for opening a network session may be used. Alternatively, where the SASE service provider returns an indication that the network traffic is not acceptable (block 220), the network session is denied (block 222).

Alternatively, where the wireless access point is not in a standalone configuration (block 206), it is determined whether another intermediary network processing device has SASE processing enabled (block 208). This may be determined, for example, based upon messages shared between intermediary network processing devices as part of an arbitration regarding which network processing device in a secure network will be providing SASE processing services similar to that discussed below in relation to FIG. 4.

Where another intermediary network processing device is not expected to perform SASE processing (block 208), SASE processing on the received network traffic is performed under the direction of the wireless access point (block 212). Again, any SASE processing known in the art may be used. Where the SASE service provider returns an indication that the network traffic is acceptable (block 214), the network session corresponding to the received network traffic is opened by the wireless access point (block 214). Any process known in the art for opening a network session may be used. Otherwise, where the SASE service provider returns an indication that the network traffic is not acceptable (block 214), the network traffic is provided to an upstream intermediary network processing device (block 216) for whatever other processing and potential denial of the network session would normally be done. Such transfer of the network traffic to the intermediary network processing device may include a side message indicating the indication from the SASE processing service that the network traffic is not acceptable.

Alternatively, where another intermediary network processing device is expected to perform SASE processing (block 208), the wireless access point passes the network traffic to an upstream intermediary network processing device (block 210). Any SASE processing of the network traffic will be performed by either the intermediary network processing device that immediately receives the network traffic or another intermediary network processing device upstream from that intermediary network processing device.

Figure 3:
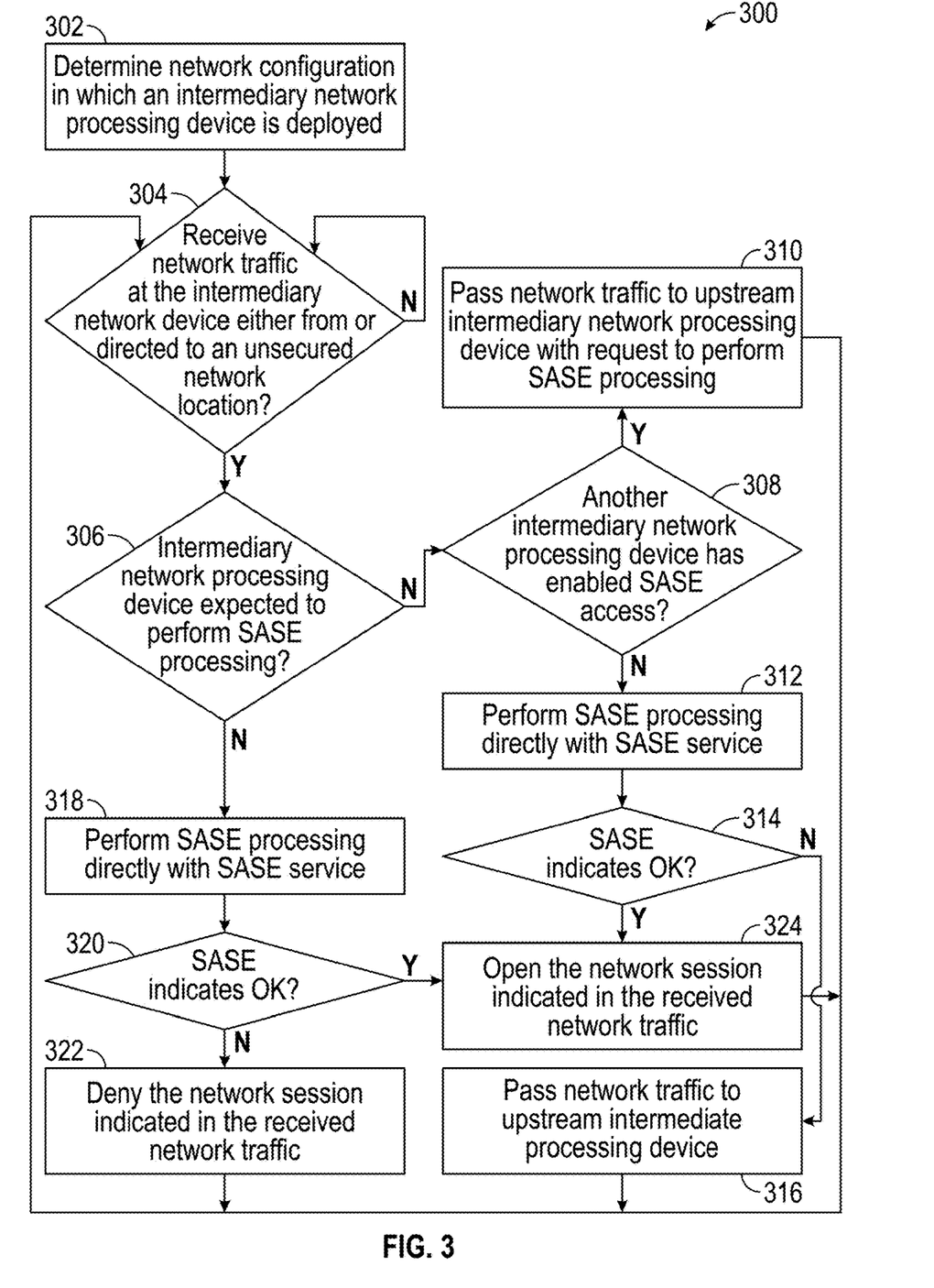
FIG. 3 is a flow diagram showing a method in accordance with various embodiments for performing SASE processing from the perspective of an intermediary network processing device.

Turning to FIG. 3, a flow diagram 300 shows a method in accordance with various embodiments for performing SASE processing from the perspective of an intermediary network processing device. Following flow diagram 300, a given intermediary network processing device executes computer readable instructions causing it to determine a network configuration in which it is deployed (block 302). Determining the network configuration includes determining a location in the network relative to other intermediary network devices. Thus, for example, an intermediary network processing device may determine that it is the interface between the secure network and an unsecure network. Alternatively, an intermediary network processing device may determine that the secure network includes one or more other intermediary network processing devices between it and an unsecure network. Based upon the disclosure provided herein, one of ordinary skill in the art will recognize a variety of methods that may be used in accordance with different embodiments for determining a location of an intermediary network processing device within a network.

The aforementioned process of determining the relative location in a network relative to other intermediary network processing devices may be done each time a new wireless access point or intermediary network processing device is introduced into a secure network or removed from the secure network. This may be part of determining which network device in the secure network will be performing SASE processing. An example of such processing is discussed more fully in relation to FIG. 4 below.

It is determined whether the intermediary network processing device has received network traffic either from or directed to an unsecure network location (block 304). Where network traffic has been received by the intermediary network processing device (block 304), it is determined whether the intermediary network processing device has been designated to perform SASE processing in the secure network (block 306). The intermediary network processing device may be identified for performing SASE processing using an arbitration process similar to that discussed below in relation to FIG. 4.

Where the intermediary network processing device is expected to perform SASE processing for the secure network (block 306), SASE processing on the received network traffic is performed (block 318). Any SASE processing known in the art may be used. As an example, in some embodiments all or part of the network traffic may be sent to an SASE service provider via a direct connection between the intermediary network processing device and the SASE service provider. The SASE service provider performs one or more security processes on the information received from the intermediary network processing device and returns a result of the security processes to the wireless access point. Based upon the disclosure provided herein, one of ordinary skill in the art will recognize a variety of SASE service providers and/or internal SASE services that may be used in relation to embodiments discussed herein. Further, based upon the disclosure provided herein, one of ordinary skill in the art will recognize a variety of security processes that may be applied by a selected SASE service provider.

Where the SASE service provider returns an indication that the network traffic is acceptable (block 320), the network session corresponding to the received network traffic is opened by the intermediary network processing device (block 324). Any process known in the art for opening a network session may be used. Alternatively, where the SASE service provider returns an indication that the network traffic is not acceptable (block 320), the network session is denied (block 322).

Alternatively, where the intermediary network processing device is not expected to perform SASE processing (block 306), it is determined whether another intermediary network processing device has SASE processing enabled (block 308). This may be determined, for example, based upon messages shared between intermediary network processing devices as part of an arbitration regarding which network processing device in a secure network will be providing SASE processing services similar to that discussed below in relation to FIG. 4.

Where another intermediary network processing device is not expected to perform SASE processing (block 308), SASE processing on the received network traffic is performed under the direction of the current intermediary network processing device (block 312). Again, any SASE processing known in the art may be used. Where the SASE service provider returns an indication that the network traffic is acceptable (block 414), the network session corresponding to the received network traffic is opened by the current intermediary network processing device (block 324). Again, any process known in the art for opening a network session may be used. Otherwise, where the SASE service provider returns an indication that the network traffic is not acceptable (block 314), the network traffic is provided to another upstream intermediary network processing device (block 316) for whatever other processing and potential denial of the network session would normally be done. Such transfer of the network traffic to the upstream intermediary network processing device may include a side message indicating the indication from the SASE processing service that the network traffic is not acceptable.

Alternatively, where another intermediary network processing device is expected to perform SASE processing (block 308), the intermediary network processing device passes the network traffic to another upstream intermediary network processing device (block 310). Any SASE processing of the network traffic will be performed by another upstream intermediary network processing device.

Figure 4:
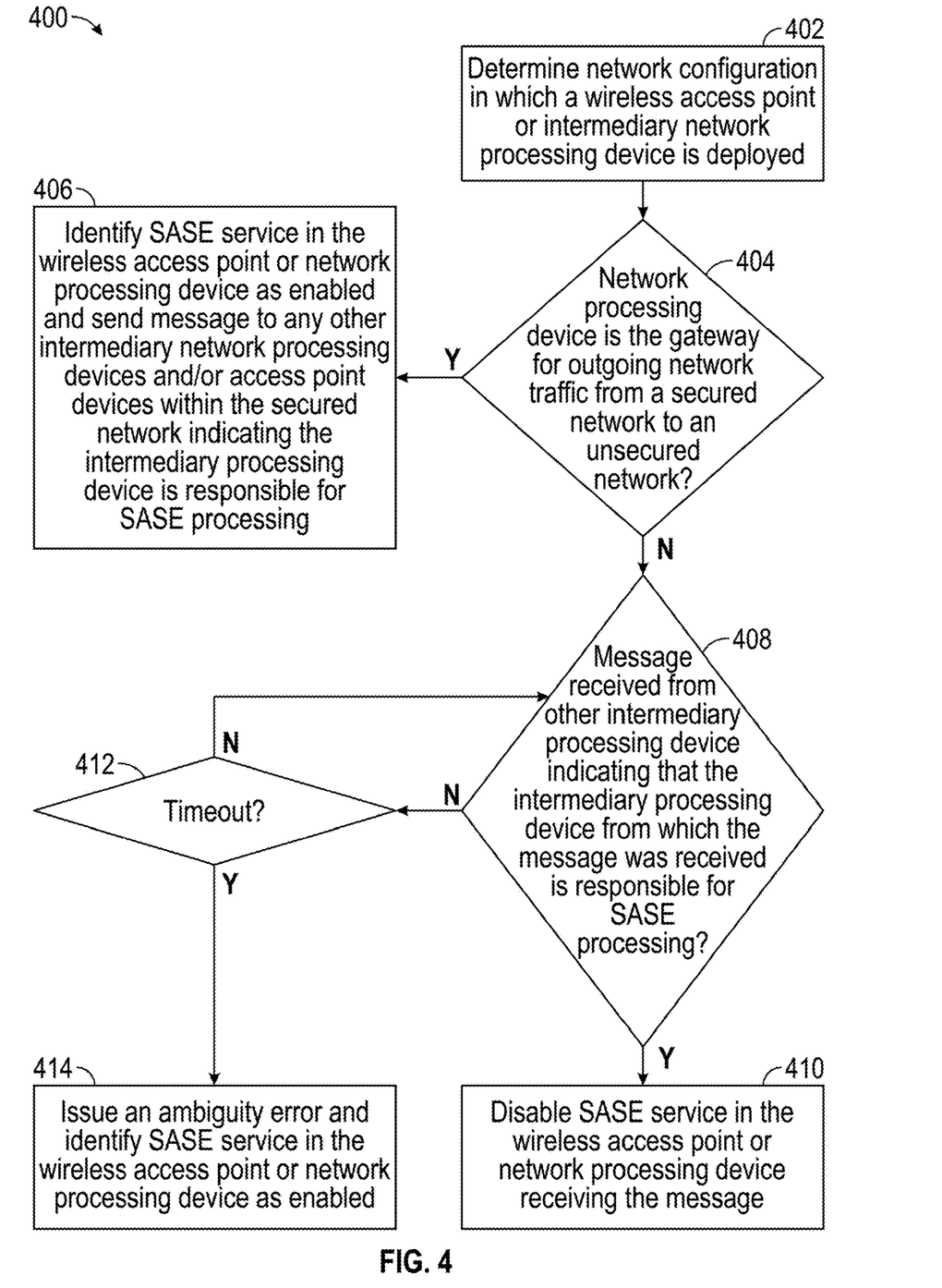
FIG. 4 is a flow diagram showing a method in accordance with some embodiments for arbitrating SASE processing control in a secure network having multiple SASE capable network processing devices.

Turning to FIG. 4, a flow diagram 400 shows a method in accordance with some embodiments for arbitrating SASE processing control in a secure network having multiple SASE capable network processing devices. Following flow diagram 400, a given wireless network access point or intermediary network processing device executes computer readable instructions causing it to determine a network configuration in which it is deployed (block 402). Determining the network configuration includes determining a location in the network relative to other intermediary network devices. Thus, for example, a wireless access point may determine that it is the only access point in the particular secure network. As another example, a wireless access point may determine that it provides wireless access to a secure network that includes one or more other intermediary network processing devices between the wireless access point and an unsecure network. As yet another example, an intermediary network processing device may determine that it is the interface between the secure network and an unsecure network. Alternatively, an intermediary network processing device may determine that the secure network includes one or more other intermediary network processing devices between it and an unsecure network. Based upon the disclosure provided herein, one of ordinary skill in the art will recognize a variety of methods that may be used in accordance with different embodiments for determining a location of either a wireless access point or an intermediary network processing device may determine its relative location within a network.

It is determined whether the given wireless network access point or intermediary network processing device is the gateway for outgoing network traffic from a secure network to an unsecure network (block 404). In the algorithm of FIG. 4, only the network device that is the gateway from the secure network to the unsecure network will be enabled to perform SASE processing, and the SASE processing capabilities of all other network devices will remain unused regardless of how network traffic is introduced to the secure network or is transiting the secure network. Thus, for example, where the secure network includes a firewall device through which all traffic transits onto an unsecure network, the SASE processing will be performed in the firewall device.

Where the given wireless network access point or intermediary network processing device is the gateway for outgoing network traffic from a secure network to an unsecure network (block 404), the SASE service capability in the given wireless network access point or intermediary network processing device is enabled (block 406). In addition, the given wireless network access point or intermediary network processing device sends a message to all other identified intermediary network processing devices indicating that it will be performing all SASE processing.

Alternatively, where the given wireless network access point or intermediary network processing device is not the gateway for outgoing network traffic from a secure network to an unsecure network (block 404), the given wireless network access point or intermediary network processing device determines whether it has received a message from another intermediary network processing device indicating that sender of the message is the intermediary processing device that will be responsible for performing SASE processing (block 408). Where the message is received by the given wireless network access point or intermediary network processing device, the given wireless network access point or intermediary network processing device disables its SASE processing capability (block 410).

Where the given wireless network access point or intermediary network processing device has not received the message (block 408), it is determined whether a timeout condition has occurred (block 414). Where a timeout condition has not occurred (block 412), the given wireless network access point or intermediary network processing device continues to await the expected message (block 408). Alternatively, where the timeout condition has occurred (block 412), the given wireless network access point or intermediary network processing device enables its SASE processing capability and issues an alert of an ambiguity error due to the failure to receive the expected message (block 414). This alert may be sent to, for example, a human administrator or a network device designated to receive and respond to such an alert.

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A wireless access point device, the device comprising:
   a processing resource;
   a non-transitory computer-readable medium, coupled to the processing resource, and having stored therein instructions that when executed by the processing resource cause the processing resource to:
     upon determining that at least one other secured access service edge (SASE) processing capable device exists in a secure network, arbitrate with the at least one other SASE processing capable device to identify which of the wireless access point or the at least one other SASE processing capable device is selected to perform SASE processing;
     upon determining that the wireless access point is the only SASE processing capable device in the secure network, identify the wireless access point as selected to perform SASE processing;
     receive a network traffic; and
     where the wireless access point is identified as selected to perform SASE processing, provide a subset of the network traffic to a SASE service provider for processing.

2. The device of claim 1, wherein the non-transitory computer-readable medium has stored therein instructions that when executed by the processing resource further cause the processing resource to:
   determine whether another SASE processing capable device exists in the secure network that includes the wireless access point.

3. The device of claim 1, wherein the non-transitory computer-readable medium has stored therein instructions that when executed by the processing resource further cause the processing resource to:
   receive an indication from the SASE service provider that the network traffic is safe; and
   open a network session corresponding to the network traffic.

4. The device of claim 1, wherein the non-transitory computer-readable medium has stored therein instructions that when executed by the processing resource further cause the processing resource to:
   where the at least one other SASE processing capable device is selected to perform SASE processing; and
   forwarding the network traffic to the at least one other SASE processing capable device.

5. The device of claim 1, wherein the at least one other SASE processing capable device is selected from a group consisting of: a network security appliance, and a network switch.

6. The device of claim 1, wherein arbitrating with the at least one other SASE processing capable device to identify which of the wireless access point or the at least one other SASE processing capable device is selected to perform SASE processing includes:
   determining if the wireless access point is a gateway for outgoing network traffic from the secure network to an unsecure network; and
   upon determining that the wireless access point is the gateway for outgoing network traffic from the secure network to the unsecure network, identifying the wireless access point as selected to perform SASE processing.

7. The device of claim 6, wherein arbitrating with the at least one other SASE processing capable device to identify which of the wireless access point or the at least one other SASE processing capable device is selected to perform SASE processing further includes:

sending a message from the wireless access point to the at least one other SASE processing capable device indicating that the wireless access point is selected to perform SASE processing.

8. The device of claim 1, wherein arbitrating with the at least one other SASE processing capable device to identify which of the wireless access point or the at least one other SASE processing capable device is selected to perform SASE processing includes:
   determining if the wireless access point is a gateway for outgoing network traffic from the secure network to an unsecure network; and
   upon determining that the at least one other SASE processing capable device is the gateway for outgoing network traffic from the secure network to the unsecure network, identifying the at least one other SASE processing capable device as selected to perform SASE processing.

9. The device of claim 8, wherein arbitrating with the at least one other SASE processing capable device to identify which of the wireless access point or the at least one other SASE processing capable device is selected to perform SASE processing further includes:
   sending a message from the at least one other SASE processing capable device to the wireless access point indicating that the at least one other SASE processing capable device is selected to perform SASE processing.

10. A method for performing secured access service edge (SASE) processing, the method comprising:
   determining, by a wireless access point in a secure network, whether another SASE processing capable device exists in the secure network;
   upon determining that at least one other SASE processing capable device exists in the secure network, arbitrating, by the wireless access point, with the at least one other SASE processing capable device to identify which of the wireless access point or the at least one other SASE processing capable device is selected to perform SASE processing;
   upon determining that the wireless access point is the only SASE processing capable device in the secure network, identifying, by the wireless access point, the wireless access point as selected to perform SASE processing;
   receiving, by the wireless access point, a network traffic; and
   where the wireless access point is identified as selected to perform SASE processing, providing, by the wireless access point, a subset of the network traffic to a SASE service provider for processing.

11. The method of claim 10, the method further including:
   where the at least one other SASE processing capable device is selected to perform SASE processing, forwarding, by the wireless access point, the network traffic to the at least one other SASE processing capable device.

12. The method of claim 10, wherein the at least one other SASE processing capable device is selected from a group consisting of: a network security appliance, and a network switch.

13. The method of claim 10, wherein arbitrating with the at least one other SASE processing capable device to identify which of the wireless access point or the at least one other SASE processing capable device is selected to perform SASE processing includes:
   determining if the wireless access point is a gateway for outgoing network traffic from the secure network to an unsecure network; and
   upon determining that the wireless access point is the gateway for outgoing network traffic from the secure network to the unsecure network, identifying the wireless access point as selected to perform SASE processing.

14. The method of claim 13, wherein arbitrating with the at least one other SASE processing capable device to identify which of the wireless access point or the at least one other SASE processing capable device is selected to perform SASE processing further includes:
   sending a message from the wireless access point to the at least one other SASE processing capable device indicating that the wireless access point is selected to perform SASE processing.

15. The method of claim 10, wherein arbitrating with the at least one other SASE processing capable device to identify which of the wireless access point or the at least one other SASE processing capable device is selected to perform SASE processing includes:
   determining if the wireless access point is a gateway for outgoing network traffic from the secure network to an unsecure network; and
   upon determining that the at least one other SASE processing capable device is the gateway for outgoing network traffic from the secure network to the unsecure network, identifying the at least one other SASE processing capable device as selected to perform SASE processing.

16. The method of claim 15, wherein arbitrating with the at least one other SASE processing capable device to identify which of the wireless access point or the at least one other SASE processing capable device is selected to perform SASE processing further includes:
   sending a message from the at least one other SASE processing capable device to the wireless access point indicating that the at least one other SASE processing capable device is selected to perform SASE processing.

17. A non-transitory computer-readable medium, the non-transitory computer readable medium having stored therein instructions that when executed by a processing resource cause the processing resource to perform a method comprising:
   upon determining that at least one other secured access service edge (SASE) processing capable device exists in a secure network, arbitrating with the at least one other SASE processing capable device to identify which of the wireless access point or the at least one other SASE processing capable device is selected to perform SASE processing;
   upon determining that the wireless access point is the only SASE processing capable device in the secure network, identifying the wireless access point as selected to perform SASE processing;
   receiving a network traffic; and
   where the wireless access point is identified as selected to perform SASE processing, providing a subset of the network traffic to a SASE service provider for processing.

18. The non-transitory computer-readable medium of claim 17, wherein the non-transitory computer-readable medium has stored therein instructions that when executed by the processing resource further cause the processing resource to:
   determine whether another SASE processing capable device exists in the secure network that includes the wireless access point.

19. The non-transitory computer-readable medium of claim 17, wherein the non-transitory computer-readable medium has stored therein instructions that when executed by the processing resource further cause the processing resource to:
   receive an indication from the SASE service provider that the network traffic is safe; and
   open a network session corresponding to the network traffic.

20. The non-transitory computer-readable medium of claim 17, wherein arbitrating with the at least one other SASE processing capable device to identify which of the wireless access point or the at least one other SASE processing capable device is selected to perform SASE processing includes:
   determining if the wireless access point is a gateway for outgoing network traffic from the secure network to an unsecure network;
   upon determining that the wireless access point is the gateway for outgoing network traffic from the secure network to the unsecure network, identifying the wireless access point as selected to perform SASE processing; and
   sending a message from the wireless access point to the at least one other SASE processing capable device indicating that the wireless access point is selected to perform SASE processing.

* * * * *